US012158711B2

(12) United States Patent
Abe et al.

(10) Patent No.: US 12,158,711 B2
(45) Date of Patent: Dec. 3, 2024

(54) ELECTROPHOTOGRAPHIC MEMBER AND ELECTROPHOTOGRAPHIC IMAGE FORMING APPARATUS

(71) Applicant: CANON KABUSHIKI KAISHA, Tokyo (JP)

(72) Inventors: Keisuke Abe, Kanagawa (JP); Masahiro Takenaga, Kanagawa (JP); Kenji Onuma, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 641 days.

(21) Appl. No.: 17/363,311

(22) Filed: Jun. 30, 2021

(65) Prior Publication Data

US 2022/0011695 A1 Jan. 13, 2022

(30) Foreign Application Priority Data

Jul. 8, 2020 (JP) ................................ 2020-117600
Jun. 11, 2021 (JP) ................................ 2021-098187

(51) Int. Cl.
*G03G 15/16* (2006.01)

(52) U.S. Cl.
CPC ......... *G03G 15/162* (2013.01); *G03G 15/161* (2013.01); *G03G 2215/00957* (2013.01)

(58) Field of Classification Search
None
See application file for complete search history.

(56) References Cited

U.S. PATENT DOCUMENTS 8,962,133 B2 2/2015 Sato et al.
9,720,353 B2 8/2017 Sakamoto et al.
10,831,134 B2 11/2020 Karube
(Continued)

FOREIGN PATENT DOCUMENTS

JP 2013-231964 A 11/2013
JP 2014-81603 A 5/2014
(Continued)

OTHER PUBLICATIONS

The Normal Distribution and Z Scores. University of Utah, May 2, 2015, https://soc.utah.edu/sociology3112/normal-distribution.php Original 2015 posting via archive.org (Year: 2015).*
(Continued)

*Primary Examiner* — Peter L Vajda
*Assistant Examiner* — Charles Collins Sullivan, IV
(74) *Attorney, Agent, or Firm* — VENABLE LLP

(57) ABSTRACT

An electrophotographic member comprising a base layer and a surface layer, the surface layer including at least one of an acrylic resin and a methacrylic resin, perfluoropolyether having a specified structure and a fluorine-containing copolymer, the fluorine-containing copolymer having a first polymerized unit of at least one of methyl acrylate and methyl methacrylate, and a second polymerized unit of at least one of methyl acrylate having a fluoroalkyl group and methyl methacrylate having a fluoroalkyl group, a molar ratio between the first polymerized unit and the second polymerized unit being 7 to 12, the fluorine-containing copolymer having Mw of 80000 or more and 150000 or less, and the ratio between Mn and Mw (Mw/Mn) being 3.0 or more and 6.5 or less.

6 Claims, 3 Drawing Sheets

(56) References Cited

U.S. PATENT DOCUMENTS

| | | | |
|---|---|---|---|
| 2013/0149540 A1 | 6/2013 | Sato | |
| 2014/0234628 A1 | 8/2014 | Takenaga | |
| 2015/0323888 A1 | 11/2015 | Sakamoto | |
| 2019/0004454 A1* | 1/2019 | Karube ................ | G03G 15/162 |
| 2020/0096885 A1 | 3/2020 | Furukawa | |
| 2021/0103236 A1 | 4/2021 | Takenaga | |

FOREIGN PATENT DOCUMENTS

| | | |
|---|---|---|
| JP | 2014-132329 A | 7/2014 |
| JP | 2018-25621 A | 2/2018 |
| JP | 2018-120083 A | 8/2018 |
| JP | 2019-12124 A | 1/2019 |
| JP | 2019-12265 A | 1/2019 |
| JP | 2020-52160 A | 4/2020 |
| JP | 2021-60577 A | 4/2021 |

OTHER PUBLICATIONS

Fomblin D2 Perfluoropolyether Technical Data Sheet, Solvay Specialty Polymers (2014).
Fomblin MD40 Perfluoropolyether Technical Data Sheet, Solvay Specialty Polymers (2014).
Fluorolink MD700 Perfluoropolyether Technical Data Sheet, Solvay Specialty Polymers (2014).

* cited by examiner

ELECTROPHOTOGRAPHIC MEMBER AND ELECTROPHOTOGRAPHIC IMAGE FORMING APPARATUS

BACKGROUND

The present disclosure relates to an electrophotographic member for use in an electrophotographic image forming apparatus such as a copying machine and a printer, and an electrophotographic image forming apparatus.

DESCRIPTION OF THE RELATED ART

One of the electrophotographic members for use in an electrophotographic image forming apparatus is an intermediate transfer belt. The intermediate transfer belt is employed in an electrophotographic image forming method including superimposing toner images of respective colors of yellow (Y), magenta (M), cyan (C) and black (K) on a toner image supporting surface (hereinafter also referred to as “outer surface”) and then transferring the images on paper all at once to obtain a full-color image. In order to respond to the recent requirement for further improvement in the process speed of an electrophotographic image forming apparatus, an intermediate transfer belt is required to achieve further improvement in transfer properties. For that reason, it is effective to reduce the toner adhesion on the outer surface of an intermediate transfer belt.

Japanese Patent Application Laid-Open No. 2019-12265 discloses an electrophotographic belt having a base layer and a surface layer, wherein the surface layer includes a binder resin, perfluoropolyether (PFPE) and a comb-shaped graft copolymer that is a copolymer of an acrylate or methacrylate having a fluoroalkyl group and a methacrylate macromonomer having a polymethylmethacrylate in a side chain, the copolymer having a number average molecular weight of 11000 or more and 15000 or less, and a peak top molecular weight of 24000 or more and 40000 or less. Further, Japanese Patent Application Laid-Open No. 2019-12265 discloses that the comb-shaped graft copolymer enables the dispersibility of PFPE in the binder resin to improve, so that the average major diameter of domains including PFPE in the surface layer can be a small size of 1 to 60 nm. Further, Japanese Patent Application Laid-Open No. 2019-12265 discloses the following in a paragraph 0037, from the viewpoints of further ease of migration of PFPE to the surface of an electrophotographic belt and further toner releasability of the electrophotographic belt. That is, use of PFPE having a non-reactive functional group such as hydroxyl group is preferred, such that PFPE is not bonded to a binder resin.

Study by the present inventors shows that PFPE having a hydroxyl group at a molecular end (hereinafter, also referred to as “PFPE-OH”) can be dispersed without reacting with an acrylic resin or methacrylic resin as binder resin. PFPE-OH that is present in a binder resin without reacting with the binder resin is excellent in migration to the outer surface of an electrophotographic belt, so that the toner releasability on the outer surface can be more rapidly recovered. The electrophotographic belt having a surface layer including PFPE-OH dispersed in an acrylic resin or methacrylic resin, however, causes unevenness in the toner releasability on the outer surface in some cases.

SUMMARY

At least one aspect of the present disclosure is directed to providing an electrophotographic member excellent in uniformity of low adhesion of toner on a toner image supporting surface. Further, another aspect of the present disclosure is directed to providing an electrophotographic image forming apparatus capable of stably forming high-quality electrophotographic images.

According to one aspect of the present disclosure, there is provided an electrophotographic member comprising a base layer and a surface layer, the surface layer including: at least one of an acrylic resin and a methacrylic resin; perfluoropolyether (PFPE); and a fluorine-containing copolymer, the PFPE having a structure represented by the following structural formula (1):

$$HO—H_2C—(CF_2O)_p(CF_2CF_2O)_q—CH_2—OH \qquad (1)$$

wherein p and q each independently represent an integer of 1 or more, the fluorine-containing copolymer having a first polymerized unit of at least one of methyl acrylate (MA) and methyl methacrylate (MMA), and a second polymerized unit of at least one of methyl acrylate having a fluoroalkyl group (F-MA) and methyl methacrylate having a fluoroalkyl group (F-MMA), a molar ratio of the first polymerized unit and the second polymerized unit (first polymerized unit/second polymerized unit) being 7 to 12, and the fluorine-containing copolymer having a weight average molecular weight (Mw) of 80000 or more and 150000 or less, and a ratio between number average molecular weight (Mn) and Mw (Mw/Mn) being 3.0 or more and 6.5 or less.

Further, according to another aspect of the present disclosure, there is provided an electrophotographic image forming apparatus provided with the afore mentioned electrophotographic member.

Further features of the present disclosure will become apparent from the following description of exemplary embodiments with reference to the attached drawings.

DESCRIPTION OF THE EMBODIMENTS

The exemplary embodiment of the present disclosure is described in detail with reference to drawings as follows. The dimensions, materials, shapes, relative positioning, etc., of components described in the following embodiments should be appropriately changed depending on the structure of an apparatus to which the present disclosure is applied and various conditions, and it is not intended that the scope of the present disclosure is limited only thereto.

The present inventors presume the reason why an electrophotographic belt having a surface layer with PFPE-OH dispersed in an acrylic resin or methacrylic resin has unevenness in toner releasability on the outer surface as follows.

That is, the surface layer with PFPE dispersed in an acrylic resin or methacrylic resin as binder resin is usually formed by curing a coating film made of coating material for forming surface layer containing a monomer as raw material of the binder resin, PFPE and a solvent thereof. PFPE-OH is, however, nearly insoluble in the solvent of the raw material monomer of acrylic resin or methacrylic resin. As a result, even though the PFPE-OH can be highly dispersed in the coating material for forming surface layer immediately after preparation of the coating material for forming surface layer, PFPE-OH aggregates with passage of time after preparation. It is therefore presumed that the surface layer formed from a coating material for forming surface layer having a collapsed dispersion state of PFPE-OH has an uneven dispersion state of PFPE-OH, so that unevenness in toner releasability on the outer surface is caused.

Based on the consideration, the present inventors have performed further examinations to obtain a dispersant for stably dispersing PFPE-OH in a coating material for forming surface layer. As a result, it has been found that a fluorine-containing copolymer having a first polymerized unit of at least one of methyl acrylate (MA) and methyl methacrylate (MMA), and a second polymerized unit of at least one of methyl acrylate having a fluoroalkyl group (F-MA) and methyl methacrylate having a fluoroalkyl group (F-MMA), with a molar ratio between the first polymerized unit and the second polymerized unit (first polymerized unit/second polymerized unit) of 7 to 12, and having a weight average molecular weight (Mw) of 80000 or more and 150000 or less, wherein a ratio between number average molecular weight (Mn) and Mw (Mw/Mn) is 3.0 or more and 6.5 or less, enables stable dispersion of PFPE-OH in the coating material for forming surface layer containing raw material monomers of acrylic resin and methacrylic resin.

(Outline and Operation of Image Forming Apparatus)

Figure 1:
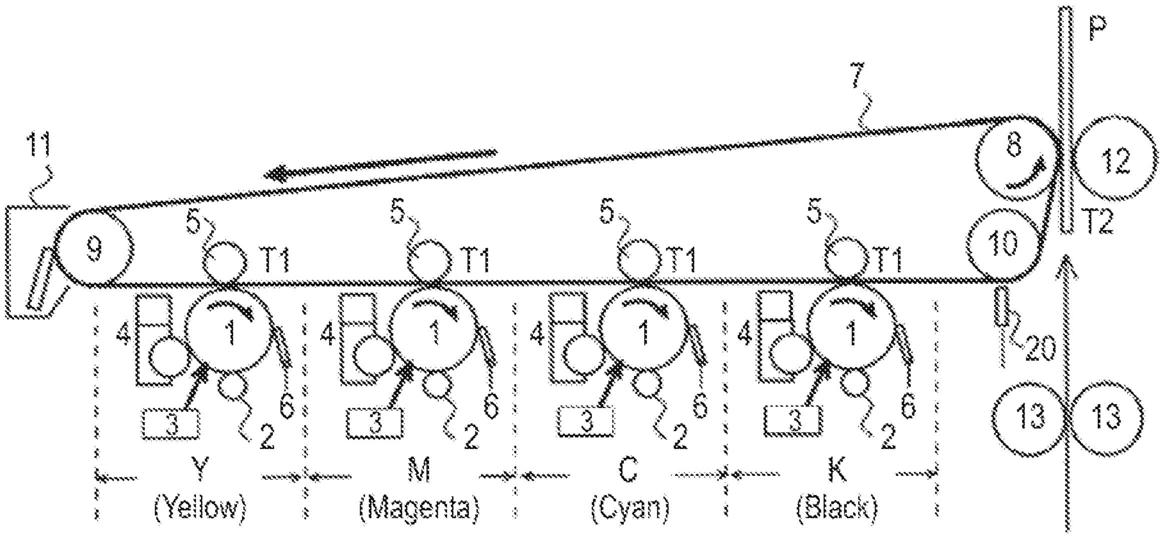
FIG. 1 is a schematic diagram illustrating an example of an electrophotographic image forming apparatus in one aspect of the present disclosure.

FIG. 1 is a schematic cross-sectional view of an electrophotographic image forming apparatus including an endless belt-shaped electrophotographic member (hereinafter, also referred to as “electrophotographic belt”) as intermediate transfer belt in one aspect of the present embodiment.

The present image forming apparatus includes four process units as image forming units having a charging unit, an exposing unit, a developing unit, a cleaner, etc., around a photosensitive drum as image support as illustrated in FIG. 1. The image on the photosensitive drum formed by each of the process units is sequentially multi-transferred on the outer surface of an electrophotographic belt that moves and passes adjacent to the photosensitive drum in a plurality of primary transfer sections to form a full-color toner image. Then, in a secondary transfer section, the toner image formed on the outer surface of the electrophotographic belt is transferred on a recording material all at once. The toner image on the recording material is then melted and fixed on the recording material in a fixation section by heat or pressure.

The details of the electrophotographic image forming apparatus are described as follows The image forming apparatus has four image forming units Y, M, C and K, that are first to fourth units for forming images of respective colors Y, M, C and K, arranged one by one in parallel from left to right in the drawing. Each of the image forming units Y, M, C and K has a drum-type electrophotographic photoreceptor 1 as image support (hereinafter referred to as drum), a charging roller 2 as charging unit, an exposing device 3 as exposing unit, a developing device 4 as developing unit, a primary transfer roller 5 as primary transfer unit, and a drum cleaner 6.

An endless-shaped electrophotographic belt 7 that constitutes an intermediate transfer member is stretched among three parallel rollers including a secondary transfer opposing roller 8 that also functions as driving roller, a deviation correction roller 9 that also functions as tension roller, and a driven roller 10. The deviation correction roller 9 is positioned on the side of the first image forming unit Y, the secondary transfer opposing roller 8 is positioned on the side of fourth image forming unit K, and the driven roller 10 is positioned below the secondary transfer roller 8. A surface opposed to the outer surface of the electrophotographic belt between the deviation correction roller 9 and the driven roller 10 is contacted with an upper surface of the drum 1 of each of the image forming units Y, M, C and K. Further, the deviation correction roller 9 is capable of suppressing deviation of the electrophotographic belt through alignment adjustment.

The primary transfer roller 5 of each of the image forming units Y, M, C and K is arranged inside the electrophotographic belt between the deviation correction roller 9 and the driven roller 10, and each is in pressure contact with the upper surface of the drum 1 across the electrophotographic belt 7. The contact region between the drum 1 of each of the image forming units Y, M, C and K and the electrophotographic belt 7 is a primary transfer nip section T1. The contact region between the electrophotographic belt 7 and a secondary transfer roller 12 is a secondary transfer nip section T2. A resist roller couple 13 is arranged on the upstream side of the secondary transfer nip section T2 in the transport direction of recording material. Further, a belt apparatus for transporting recording material and a fixation apparatus not illustrated in drawing are sequentially arranged on the downstream side of the secondary transfer nip section T2 in the transport direction of recording material.

Operation for forming a full-color image is as follows. The first to fourth image forming units Y, M, C and K are driven at a specified control timing of an image forming sequence. By the driving, each drum 1 is driven to rotate in the clockwise arrow direction at a specified same speed. The electrophotographic belt 7 is also rotated in the counter-clockwise arrow direction at the same speed as the rotation speed of the drum 1 by the secondary transfer opposing roller 8.

The surface of the rotating drum 1 is uniformly charged to a specified polarity at a specified potential by the charging roller 2. The charged surface of the drum 1 is subjected to image exposure by the exposing device 3. In the present embodiment, the exposing device 3 is a laser scanner, which emits modulated laser light corresponding to image information signals so as to subject the charged surface of the drum 1 to scanning exposure. Thereby, an electrostatic image (electrostatic latent image) corresponding to a scanning-exposed pattern is formed on the drum surface. The electrostatic image thus formed is developed as a toner image by the developing device 4.

Through the electrophotographic process described above, in the first image forming unit Y, a yellow toner image corresponding to a yellow component image in separated color component images of an original full-color image is formed on the surface of drum 1. In the second image forming unit M, a magenta toner image corresponding to a magenta component image is formed, and in the third image forming unit C, a cyan toner image corresponding to a cyan component image is formed, at specified control timings, respectively. Further, in the fourth image forming unit K, a black toner image corresponding to a black component image is formed at a specified control timing.

In the primary transfer nip section T1 of the first image forming unit Y, the yellow toner image formed on the drum 1 is subjected to primary transfer on the outer surface of the electrophotographic belt 7 driven to rotate. Subsequently, in the primary transfer nip section T1 of the second image forming unit M, the magenta toner image formed on the drum 1 is subjected to primary transfer through superimposition on the yellow toner image on the outer surface of the electrophotographic belt 7. Similarly, in the respective first transfer nip sections T1 of the third image forming unit C and the fourth image forming unit K, the cyan toner image and the black toner image are sequentially subjected to primary transfer on the outer surface of the electrophotographic belt 7.

In other words, on the outer surface of the electrophotographic belt 7, the toner images Y, M, C and K are sequentially superimposed in a specified manner to make superimposed (multiple) transfer, so that a full-color unfixed toner image is synthesized. In each of the primary transfer nip sections T1, the primary transfer of the toner image from the drum 1 to the electrophotographic belt 7 is as follows. That is, a specified primary transfer bias is applied to the primary transfer roller 5 from a primary transfer power source not illustrated in drawing, so that the toner image is electrostatically transferred to the electrophotographic belt 7 from the drum 1.

The primary transfer bias is a direct current voltage at a specified potential, in a reverse polarity to the charging polarity of toner. In each of the image forming units Y, M, C and K, the surface of the drum 1 after passing through the primary transfer nip section is cleaned by removing residual toner of primary transfer with a drum cleaner 6 so as to be repeatedly used for imaging.

The unfixed full-color toner image synthesized on the electrophotographic belt 7 as described above is transported to the secondary transfer nip section T2 as contact region between the secondary transfer roller 12 and the electrophotographic belt 7 by the subsequent rotation of the electrophotographic belt 7. The start of rotation of the resist roller couple 13 is controlled, such that the print start position of recording material P is aligned with the secondary transfer nip section T2 at the timing of arrival of the leading edge of the unfixed full-color toner image formed on the outer surface of the electrophotographic belt 7 to the secondary transfer nip section T2. In the process where the recording material P is held and transported through the second transfer nip section T2, a secondary transfer bias at a specified potential in a reverse polarity to the charging polarity of toner is applied to the secondary transfer roller 12 from a secondary transfer power source. The secondary transfer bias is a direct current voltage at a specified potential in a reverse polarity to the charging polarity of toner.

Thereby, the unfixed full-color toner image on the outer surface of the electrophotographic belt 7 is subjected to secondary transfer to the recording material P all at once. The recording material P coming out of the secondary transfer nip section T2 is separated from the electrophotographic belt 7 to be introduced into a fixation device by a recording material transport belt device. Toners of the respective color toner images are melted and mixed to be fixed on the surface of recording material as full-color printed image (image fixation), and a full-color print is discharged outside the machine.

After separation of the recording material, the residual secondary transfer toner is cleaned off the outer surface of the electrophotographic belt 7 by a cleaner 11 in the subsequent rotation process of the electrophotographic belt 7 for preparation of a next electrophotographic image forming step. The cleaner 11 has a cleaning blade for scraping off the residual secondary transfer toner adhered to the outer surface of the electrophotographic belt, and the scraped residual toner is collected in a toner collection box not illustrated in drawing, disposed in the cleaner 11.

A patch detection sensor 20 having a function for detecting image density (toner image detection unit) is disposed at a position opposed to the electrophotographic belt section stretched by a stretch roller 10. The sensor optically detects reflected light and scattered light of light irradiated to a toner image for adjustment (patch image) formed on the electrophotographic belt 7.

During a period other than the period of primary transfer of a toner image to be secondarily transferred to recording material, the toner image for adjustment (patch image) is formed on the outer surface of the electrophotographic belt 7. Corresponding to the result, image forming conditions are adjusted.

The electrophotographic belt 7 is described in detail as follows. The electrophotographic belt in the present disclosure has a base layer and a surface layer on the base layer.

(Electrophotographic Belt)

Figure 2:
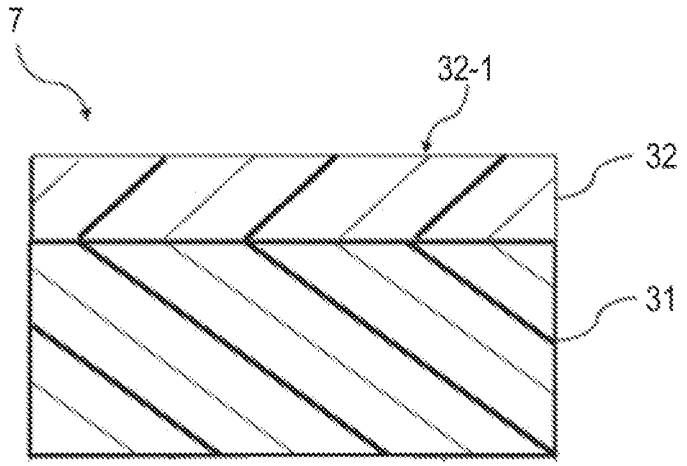
FIG. 2 is a schematic cross-sectional view of an electrophotographic member in one aspect of the present disclosure in thickness direction.

An electrophotographic belt 7 in one aspect of the present disclosure has, for example, a base layer 31 and a surface layer 32 disposed on the outer circumference of the base layer 31 as illustrated in FIG. 2. A surface 32-2 on the opposite side of the side opposed to the base layer 31 of the surface layer 32 constitutes a toner image support face (outer surface) of the electrophotographic belt 7.

<Base Layer>

As the material that constitutes the base layer 31, a resin having a mechanical strength and a bending resistance for use as electrophotographic belt of an image forming apparatus. Examples of the resin include polyamide, polyacetal, polyarylate, polycarbonate, polyphenylene ether, polyethylene terephthalate, polyethylene naphthalate, polybutylene naphthalate, polysulfone, and polyether sulfone. In addition thereto, examples thereof include polyphenyl sulfide, polybutylene terephthalate, polyether ether ketone, polyvinylidene fluoride, polyvinyl fluoride, a polyether amide copolymer, a polyurethane copolymer, polyimide, and polyamide imide. It is preferable that the base layer 31 be formed from one of these resins or a mixture thereof.

In order to impart electroconductivity to the base layer 31, an electroconductive material may be usually added. Examples of the electroconductive material include a carbon-based inorganic conductive particle such as carbon black, carbon fiber, and carbon nanotube, and an inorganic electroconductive particle such as metal oxide including zinc antimonate, zinc oxide, tin oxide and titanium oxide. It is preferable that the base layer 31 have a volume resistivity controlled in the range of 1E+8 [Ω·cm] or more and 1E+12 [Ω·cm] or less. Further, it is preferable that the base layer 31 have a surface resistivity controlled in the range of 1E+8 [Ω/sq] or more and 1E+14 [Ω/sq] or less.

With a volume resistivity of the base layer 31 controlled in the range of 1E+12 [Ω·cm] or less, the degradation of primary transferability and secondary transferability resulting from application of a specified transfer bias can be suppressed. Also, with a volume resistivity of the base layer 31 controlled in the range of 1E+8 [Ω·cm] or more, the occurrence of unevenness in resistance can be suppressed and the occurrence of uneven transfer and the occurrence of image defects can be prevented. Further, with a surface resistivity of the base layer 31 controlled in the above-described range, image defects caused by peeling discharge and toner scattering at the timing when the transfer material is separated from the electrophotographic belt can be reduced. It is preferable that the thickness of the base layer 31 be 40 μm or more and 200 μm or less from the viewpoints of mechanical strength and bending resistance.

It is also preferable that the electrical resistance of the electrophotographic belt for electrophotography after formation of the surface layer 32 on the base layer 31 be nearly equal to the value. It is therefore preferable that the surface layer 32 of the electrophotographic belt for electrophotography also be semiconductive. In other words, it is preferable that the volume resistivity of the electrophotographic belt for electrophotography be controlled in the range of 1E+8 [Ω·cm] or more and 1E+12 [Ω·cm] or less. Further, it is preferable that the surface resistivity of the electrophotographic belt for electrophotography be controlled in the range of 1E+8 [Ω/sq] or more and 1E+14 [Ω/sq] or less. In order to control the volume resistivity and the surface resistivity of the electrophotographic belt for electrophotography, it is preferable that the surface layer 32 contain a conducting agent. As the conducting agent contained in the surface layer 32, the same one as the conducting agent that can be used in the base layer 31 may be used.

<Surface Layer>

The surface layer 32 contains at least one of an acrylic resin and a methacrylic resin as binder resin, and further contains PFPE-OH and a fluorine-containing copolymer.

<Binder Resin>

The present disclosure is characterized by using an acrylic resin as matrix resin. The acrylic resin is used for dispersing PFPE, securing adhesion to the base layer 31 and securing mechanical strength. A methacrylic resin or an acrylic resin is suitably used. Hereinafter, the methacrylic resin and the acrylic resin are collectively referred to as acrylic-based resin.

Examples of the polymerizable monomer for forming the acrylic-based resin include the following (i) and (ii). As the polymerizable monomer, a coating material available in the market also may be used.

(i) At least one acrylate selected from the group consisting of pentaerythritol triacrylate, pentaerythritol tetraacrylate, ditrimethylolpropane tetraacrylate, dipentaerythritol hexaacrylate, alkyl acrylate, benzyl acrylate, phenyl acrylate, ethylene glycol diacrylate, and bisphenol A diacrylate.

(ii) At least one methacrylate selected from the group consisting of pentaerythritol trimethacrylate, pentaerythritol tetramethacrylate, ditrimethylolpropane tetramethacrylate, dipentaerythritol hexamethacrylate, alkyl methacrylate, benzyl methacrylate, phenyl methacrylate, ethylene glycol dimethacrylate, and bisphenol A dimethacrylate.

Among them, one having high hardness is preferred, considering friction with other components such as a photoreceptor and a cleaning blade. It is therefore preferable that many cross-linkable monomers having two or more functional groups be used also for the acrylic-based resin to have higher hardness.

Further, a method for forming an acrylic resin from such a polymerizable monomer includes adding a photopolymerization initiator and performing polymerization using electron beam or ultra-violet rays.

Examples of the photopolymerization initiator include a radical-generating photopolymerization initiator such as benzophenone, thioxanthone, benzyl dimethyl ketal, α-hydroxy ketone, α-hydroxy alkyl phenone, α-amino ketone, and α-amino alkyl phenone. Other examples thereof include radical-generating photopolymerization initiator such as monoacylphosphine oxide, bisacylphosphine oxide, hydroxy benzophenone, amino benzophenone, titanocene, oxime ester, and oxyphenyl acetic acid ester.

The content of the acrylic resin is preferably 20 mass % or more and 70 mass % or less based on the mass of total solid content of the surface layer 32. The lower limit of the content is determined from the viewpoint of film strength, and the upper limit of the content is determined from the viewpoint of relative content of PFPE and dispersant component.

<PFPE-OH>

As described above, PFPE-OH is non-reactive with the acrylic resin or methacrylic resin that constitutes a matrix, capable of forming fine domains in the matrix containing these resins. Further, having no chemical bond to the resin that constitutes the matrix, PFPE-OH is excellent in migration to the outermost surface of the surface layer, capable of imparting good toner releasability to the outermost surface.

Specifically, PFPE-OH has, for example, a structure represented by the following structural formula (1).

$$HO—H_2C—(CF_2O)_p(CF_2CF_2O)_q—CH_2—OH \quad (1)$$

wherein p and q each independently represent an integer of 1 or more.

Examples of the PFPE-OH having the structure represented by the structural formula (1) include “Fomblin (registered trademark) D2” (manufactured by Solvay Specialty Polymers K.K.) and “Fluorolink (registered trademark) D4000” (manufactured by Solvay Specialty Polymers K.K.).

It is preferable that the weight average molecular weight Mw of the PFPE-OH be 1000 or more and 9000 or less from the viewpoint of migration of PFPE-OH to the surface of the electrophotographic belt.

The weight average molecular weight is a value obtained by measuring a 1,1,2,2,3,3,4-heptafluorocyclopentane solution of PFPE-OH with a liquid chromatographic apparatus (manufactured by Shimadzu Corporation). Incidentally, 1,1,2,2,3,3,4-heptafluorocyclopentane is commercially available, for example, as “Zeorora H” (trade name, manufactured by Zeon Corporation).

It is also preferable that the content of PFPE-OH in the surface layer be 10 mass % or more and 40 mass % or less based on the mass of total solid content in the surface layer. With a content in the range, both of stable provision for toner releasability to the outermost surface of the surface layer and high strength of the surface layer can be better achieved.

It may be confirmed that the PFPE-OH contained in the surface layer has a hydroxyl group, for example, by the following method. First, an electrophotographic belt including the surface layer is immersed in a fluorine solvent to extract the PFPE-OH. Examples of the fluorine solvent that is commercially available include “Asahiklin AE-3000” (trade name, manufactured by AGC Inc.), “Zeorora H” (trade name, manufactured by Zeon Corporation), and “Novec 7300” (trade name, manufactured by 3M Company). Subsequently, the PFPE-OH extracted is isolated by volatilization of the fluorine solvent from the extract. Through observation of a peak at 3400 $cm^{-1}$ in an FT-IR spectrum chart of the resulting PFPE-OH, which indicates the presence of hydroxyl group, the presence of hydroxyl group in a PFPE-OH molecule can be confirmed. Further, through observation of fluorine signals derived from $—OCF_2O—$ (from −40 ppm to −60 ppm), $—OCF_2CH_2—$ (in the vicinity of −80 ppm), and —$OCF_2CF_2O$— (in the vicinity of −90 ppm), the molecular structure of PFPE-OH can be confirmed.

PFPE-OH is insoluble in non-aqueous composition. This can be confirmed by the following method. First, an electrophotographic belt including the surface layer is immersed in a fluorine solvent to extract the PFPE-OH. Subsequently, PFPE is isolated by volatilization of the fluorine solvent from the extract, and mixed with a verification solvent at a specified ratio to visually confirm phase separation.

<Fluorine-Containing Copolymer>

The fluorine-containing copolymer functions as dispersant for allowing PFPE-OH to be more stably present as domain in matrix in the surface layer. The fluorine-containing copolymer has a first polymerized unit of at least one of methyl acrylate (MA) and methyl methacrylate (MMA) and a second polymerized unit of at least one of methyl acrylate having a fluoroalkyl group (F-MA) and methyl methacrylate having a fluoroalkyl group (F-MMA). The molar ratio between the first polymerized unit and the second polymerized unit (first polymerized unit/second polymerized unit) is 7 to 12. The weight average molecular weight (Mw) is 80000 or more and 150000 or less. The ratio between the number average molecular weight (Mn) and Mw (Mw/Mn) is 3.0 or more and 6.5 or less.

Such a fluorine-containing copolymer has a region with high affinity for both of a perfluoroalkyl chain of PFPE-OH and acrylic resin or methacrylic resin.

It is preferable that the first polymerized unit be a methyl methacrylate unit represented by the following structural formula (2).

(2)

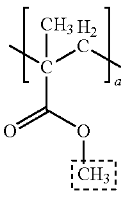

wherein a represents an integer of 1 or more.

It is preferable that the second polymerized unit be a perfluoroalkyl ethyl methacrylate unit represented by the following structural formula (3).

(3)

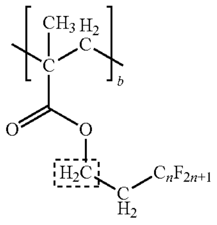

wherein b is an integer of 1 or more, and n is the number of carbon atoms in the fluoroalkyl chain, which is an integer of 1 or more and 10 or less. In Examples described below, a material having n=6 was used.)

In such a fluorine-containing copolymer, the fluoroalkyl group in the second polymerized unit adsorbs to PFPE-OH, and the first polymerized unit has high affinity for acrylic resin or methacrylic resin for use as binder resin, so that a steric hindrance effect for preventing aggregation of PFPE-OH functions.

The copolymerization ratio between the first polymerized unit and the second polymerized unit specified in the present disclosure allows the balance between the adsorption performance of fluoroalkyl group and the affinity for acrylic to be in desirable range for the PFPE that is insoluble in non-aqueous composition, so that good dispersion performance can be exhibited. Further, the ranges of the weight average molecular weight Mw, and the ratio Mw/Mn between the number average molecular weight Mn and the weight average molecular weight Mw are suitable for the dispersant to sufficiently cover PFPE-OH such that dispersion performance is exhibited. The PFPE-OH for use in the present disclosure is insoluble in non-aqueous composition, being in a liquid state, not in a solid particulate state. It is therefore presumed that with use of a dispersant having a wide molecular weight distribution for the PFPE-OH having an unstable dispersion particle size in an indefinite state, the PFPE-OH can be thoroughly covered. As a result, even with use of PFPE-OH that is insoluble in non-aqueous composition, precipitation of PFPE-OH is suppressed and the distribution of PFPE-OH after formation of the surface layer is refined and uniformized, so that low adhesion to the surface of the electrophotographic belt can be uniformly maintained over a long period.

The copolymerization ratio between the first polymerized unit and the second polymerized unit may be measured by a nuclear magnetic resonance (NMR) apparatus. Specifically, the dispersant is subjected to removal of solvent under reduced pressure at 90° C. for about 3 hours by a centrifuge, and then solid matter is collected and dissolved in deuterated chloroform for measurement of NMR. From the integrated value of signal intensity in $^1$H-NMR chart, the polymerization ratio between the first polymerized unit and the second polymerized unit can be calculated.

Figure 4:
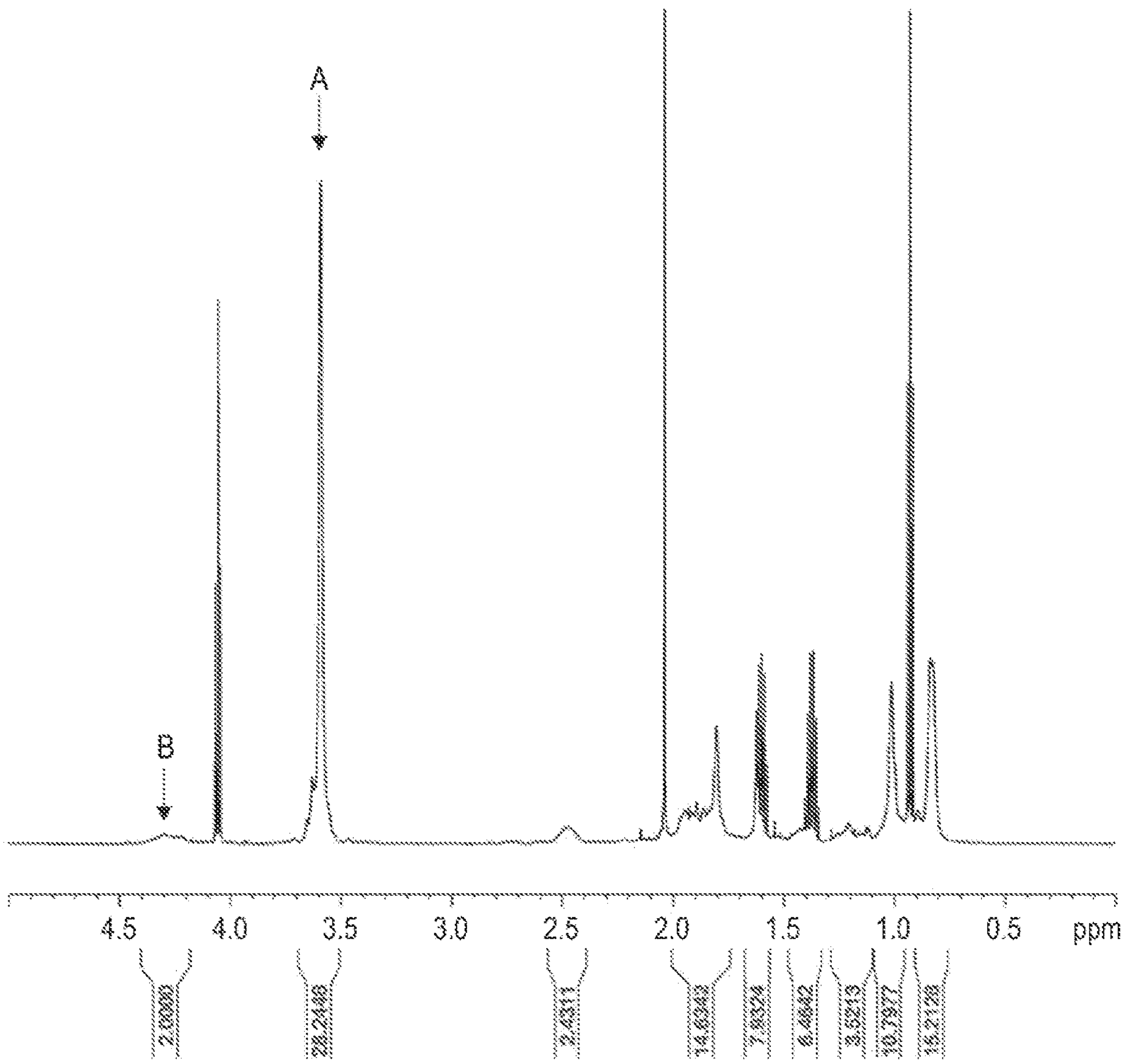
FIG. 4 is an example of a chart of $^1$H-NMR signal intensity.

With reference to a signal intensity chart of $^1$H-NMR illustrated in FIG. 4 as an example, the specific calculation method of the polymerization ratio between the first polymerized unit and the second polymerized unit is described. The integrated value of a peak A at 3.6 ppm caused by $CH_3$ contained in the first polymerized unit (methyl group surrounded by dashed lines in the structural formula (2)) and the integrated value of a peak B at 4.3 ppm caused by $CH_2$ contained in the second polymerized unit (methylene group surrounded by dashed lines in the structural formula (3)) are calculated, respectively. In the example illustrated in FIG. 4, the integrated value of the peak A is 28.2 and the integrated value of the peak B is 2.0. The numerical values represent the abundance ratio (molar ratio) of measured nucleus (H). The peak A is caused by $CH_3$, reflecting three H, and the peak B is caused by $CH_2$, reflecting two H. In terms of number ratio of H, the molar ratio of the first polymerized unit=28.2/3≈9, and the molar ratio of the second polymerized unit=2.0/2=1 are calculated, respectively. In that case, the polymerization ratio (first polymerized unit/second polymerized unit) is therefore 9.

The number average molecular weight and the weight average molecular weight may be measured by a gel permeation chromatography (GPC) apparatus. Specifically, the dispersant is dissolved in tetrahydrofuran. The solution is injected into a column (trade name: TSK-GEL MULTIPORE HXL-M, manufactured by Tosoh Corporation) so as to pass through the column at a specified flow rate. Using a gel permeation chromatograph apparatus (HLC-8220 manufactured by Tosoh Corporation) for eluting components adsorbed to the column, the elution time distribution is measured. From the measurement results, molecular weight distribution is calculated based on a calibration curve prepared in advance using a polystyrene standard sample having a known molecular weight (e.g., trade name: TSK gel standard polystyrene, item Nos. "0005202" to "0005221"). Based on the results, the number average molecular weight and the weight average molecular weight are calculated.

A copolymer of methyl methacrylate having a fluoroalkyl group (F-MMA) and methyl methacrylate (MMA) is commercially available. Examples thereof include Aron (registered trademark) GF-150, GF-300, GF-400 and GF-420 manufactured by Toagosei Co., Ltd., and FD-420 manufactured by Kyoeisha Chemical Co., Ltd.

Using the commercially available materials, the dispersant of the present disclosure having a polymerization ratio, i.e., first polymerized unit/second polymerized unit, a number average molecular weight, and a weight average molecular weight in specified numerical value ranges, respectively, can be prepared by the following method. In other words, the commercially available copolymer can be prepared by using a fractionation HPLC apparatus (trade name: LC-908, manufactured by Japan Analytical Industry Co., Ltd.). As the column, for example, "JAIGEL-1H", "JAIGEL-2H", "JAIGEL-3H", "JAIGEL-4H" and "JAIGEL-5H" (represented by trade names, manufactured by Japan Analytical Industry Co., Ltd., diameter: 20 mm, length: 600 mm, fractionation column) may be used. Specifically, the commercially available material is injected into the column, and the solution is collected at each elution time to obtain a dispersant having a different molecular weight distribution. Each solution is subjected to the measurement of molecular weight distribution by the GPC apparatus and the measurement of copolymerization ratio by the NMR apparatus. From the separated solutions, a dispersant having a desirable copolymerization ratio, number average molecular weight Mn and weight average molecular weight Mw is selected. A plurality of separated solutions may be mixed for adjustment. The dispersant of the present disclosure may be thus obtained.

Use of the dispersant of the present disclosure in an electrophotographic belt may be confirmed by the following method. First, after removal of PFPE by immersion in the above-described fluorine solvent (e.g., trade name: Asahiklin AE-3000 manufactured by AGC Inc.), the dispersant is extracted by immersion once again in a solvent excellent in solubility of the dispersant, in which PFPE for use in the present disclosure is not dissolved. Examples of such a solvent include butyl acetate, ethyl acetate, MEK and MIBK. The extract is subjected to the measurement of copolymerization ratio by NMR, and the measurement of Mn and Mw by GPC.

The content of the dispersant based on the mass of total solid content of the surface layer is preferably 5 mass % or more and 30 mass % or less, more preferably 15 mass % or more and 25 mass % or less.

<Conducting Agent>

To the surface layer 32, a conducting agent may be added for imparting electroconductivity thereto. Examples of the conducting agent include a carbon-based inorganic conductive particle such as carbon black, carbon fiber, and carbon nanotube, and metal oxide such as zinc antimonate, zinc oxide, tin oxide and titanium oxide.

<Matrix-Domain Structure>

Figure 3:
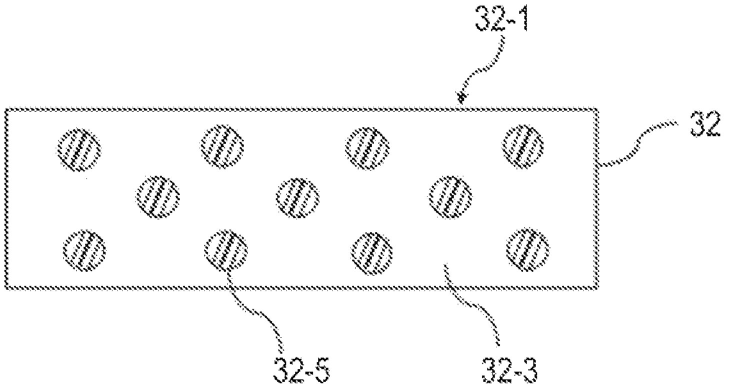
FIG. 3 is an explanatory drawing of a matrix-domain structure observed in the cross section of a surface layer in one aspect of the present disclosure in thickness direction.

As schematically illustrated in FIG. 3, in the cross-section of the surface layer 32 in the thickness direction, a matrix-domain structure with a PFPE-OH-containing domain 32-5 dispersed in a binder resin-containing matrix 32-3 is observed.

PFPE-OH has a very small surface free energy. The PFPE-OH contained in the surface layer of an electrophotographic belt migrates to the interface between the surface layer and air, i.e., the outermost surface side of the surface layer, derived from the small surface free energy, capable of imparting excellent toner releasability to the surface of the surface layer 32.

Further, in the surface layer 32, the domain 32-5 of PFPE-OH present in the matrix 32-3 that contains acrylic resin or methacrylic resin has more uniform size due to the effect of the fluorine-containing copolymer having the specific structure described above. Coarse and dense portions in the distribution of the PFPE-OH-containing domain therefore hardly occur in the surface layer 32. As a result, portions having a large or small migration amount of PFPE-OH to the outermost surface of the surface layer hardly occur, so that occurrence of variation in the amount of PFPE present in the outermost surface can be prevented.

Although it is preferable that the domain include substantially PFPE-OH alone, a compound other than PFPE-OH may be contained in the domain in addition to PFPE-OH within a range where the effect of the present disclosure is exhibited. Alternatively, an additive compatible with PFPE-OH may be added to impart other characteristics. Further, even in the case where voids are present in the domain not fully filled with PFPE-OH, the effect of the present disclosure can be exhibited.

The matrix-domain structure may be confirmed by cutting out an electrophotographic belt and observing the cross-section of the surface layer 32 of the electrophotographic belt in the thickness direction by scanning electron microscope (SEM). The major diameter of the domain observed in the cross-section has a standard deviation of preferably 1 nm or more and 50 nm or less, particularly preferably 15 nm or more and 37 nm or less.

A domain containing PFPE-OH may be identified by elemental analysis method such as energy dispersive X-ray spectroscopy (EDX), TOF-SIMS and Auger spectroscopy. For example, fluorine element was detected in the domain of the electrophotographic belt of the present disclosure by elemental analysis by EDX, so that the domain was identified as a domain containing PFPE-OH. Alternatively, a fragment having a fluorocarbon ether structure derived from PFPE-OH in the domain may be observed by TOF-SIMS.

<Production Method of Electrophotographic Belt>

A specific production method of the electrophotographic belt of the present disclosure is described as follows. Incidentally, the present disclosure is not limited to the following production method.

The base layer 31 of the electrophotographic belt can be prepared by the following method. For example, in the case of using a thermosetting resin such as polyimide, carbon black as conducting agent is dispersed together with a precursor of thermosetting resin or a soluble thermosetting resin, and a solvent to make a varnish. The varnish is coated on a forming mold of a centrifugal forming apparatus. Subsequently, a semi-electroconductive film is formed through a firing step of the coated film.

In the case of using a thermoplastic resin, carbon black as conducting agent, the thermoplastic resin, and an additive on an as needed basis are mixed and melt-kneaded by a biaxial kneader or the like to make a semi-electroconductive resin composition. Subsequently, the resin composition is melt-extruded into a sheet, a film, or a seamless belt, so that a semi-electroconductive film can be obtained. The seamless belt may be a belt extruded from a cylindrical die, or may be made by splicing sheets formed by extrusion. Alternatively, the seamless belt may be formed by hot pressing or by injection molding. It is preferable that the film thickness of the semi-electroconductive film to make the base layer 31 be 30 μm or more and 150 μm or less.

Further, it is preferable that the semi-electroconductive film to make the base layer 31 be subjected to crystallization treatment in order to enhance the mechanical strength and the durability of the electrophotographic belt. Examples of the crystallization treatment include annealing treatment at a temperature equal to or more than the glass transition temperature of the resin for use, so as to accelerate crystallization of the resin for use. The electrophotographic belt thus obtained is not only excellent in mechanical strength and durability but also excellent in terms of abrasion resistance, chemical resistance, sliding properties, toughness and flame retardance.

Examples of the method for forming the surface layer 32 of the electrophotographic belt include the following method. First, in order to form a binder resin as the constituent component described above of the surface layer 32, a polymerizable monomer, a polymerization initiator, PFPE-OH, a dispersant, a conducting agent, and other additives are dissolved and dispersed in a suitable organic solvent to obtain a coating liquid for the surface layer. Subsequently, the coating liquid is applied to the outer circumference of the base layer 31 by a method such as ring coating, dip coating and spray coating, and dried at 60 to 90° C. for removal of the organic solvent. UV curing is then performed using a UV irradiator, so that the electrophotographic belt of the present disclosure is obtained.

It is also preferable that the thickness of the surface layer 32 be 2 μm or more and 10 μm or less. With a thickness of the surface layer 32 of 2 μm or more, durability can be secured while achieving both of preservation of low adhesion and inhibition of detachment. With a thickness of the surface layer 32 of 10 μm or less, required bending resistance can be obtained.

According to one aspect of the present disclosure, an electrophotographic member having more uniformity in low adhesion of toner on a toner supporting surface can be obtained. Further, according to another aspect of the present disclosure, an electrophotographic image forming apparatus capable of stably forming high-quality electrophotographic images can be obtained.

EXAMPLES

<Preparation of Dispersants 1 to 11>

A solvent-based fluorine powder dispersant (trade name: FD-420, manufactured by Kyoeisha Chemical Co., Ltd.) was fractionated by the fractionation HPLC apparatus described above to prepare dispersants 1 to 11 having physical properties shown in the following Table 1.

TABLE 1

| Dispersant No. | Molar ratio (First polymerized unit/Second polymerized unit) | Mn | Mw | Mw/Mn | Solid content concentration (mass %) |
|---|---|---|---|---|---|
| 1 | 9.0 | 25000 | 91000 | 3.6 | 20 |
| 2 | 12.0 | 27000 | 88000 | 3.3 | 20 |
| 3 | 7.0 | 21000 | 81000 | 3.9 | 20 |
| 4 | 9.0 | 23500 | 151000 | 6.4 | 20 |

TABLE 1-continued

| Dispersant No. | Molar ratio (First polymerized unit/Second polymerized unit) | Mn | Mw | Mw/Mn | Solid content concentration (mass %) |
|---|---|---|---|---|---|
| 5 | 9.0 | 32000 | 95000 | 3.0 | 20 |
| 6 | 13.0 | 24000 | 92000 | 3.8 | 20 |
| 7 | 6.0 | 26000 | 93000 | 3.6 | 20 |
| 8 | 9.0 | 24300 | 160000 | 6.6 | 20 |
| 9 | 9.0 | 26000 | 75000 | 2.9 | 20 |
| 10 | 9.0 | 15000 | 110000 | 7.3 | 20 |
| 11 | 9.0 | 31000 | 85000 | 2.7 | 20 |

Example 1

The materials in the following Table 2 were mixed with a stirring homogenizer (AS One Corporation) to prepare a coating material 1 for forming surface layer.

TABLE 2

| Material | Amount compounded |
|---|---|
| Dipentaerythritol hexaacrylate (DPHA) | 6.8 parts by mass |
| Pentaerythritol tetraacrylate (PETTA) | 14.5 parts by mass |
| Pentaerythritol triacrylate (PETA) | 4.2 parts by mass |
| Methyl ethyl ketone | 25.5 parts by mass |
| Antimony-doped tin oxide fine particle (SN-100P, manufactured by Ishihara Sangyo Kaisha, Ltd.) | 4.3 parts by mass |
| Photopolymerization initiator (trade name: Irgacure 184, manufactured by BASF) | 1.9 parts by mass |
| PFPE-OH1 (trade name: Fomblin D2, manufactured by Solvay Specialty Polymers K.K.) | 14.3 parts by mass |
| Dispersant 1 | 28.5 parts by mass |

An electrophotographic belt made of polyimide fitted to a full-color copying machine (trade name: iRC 2620, manufactured by Canon Inc.) was used as a base layer 31. On the outer circumferential surface of the base layer 31, a coating film of the coating material for forming surface layer was formed and dried at a temperature of 70° C. for 3 minutes. The coating film was then exposed to UV rays at an integrated light quantity of 500 mJ/cm$^2$ to be cured. An electrophotographic belt 1 having a surface layer with a film thickness of 4 μm was thus obtained.

The type and molecular weight (Mw) of PFPE-OH used, MMA/F-MMA copolymerization ratio, molecular weight (Mn and Mw), and amount added of the dispersant are shown in Table 3.

In Table 3, the amount of dispersant added is described as content in the total solid content. The total solid content is calculated with the content of methyl ethyl ketone as solvent and the solvent content of the dispersant excluded from the components of the composition.

The coating material 1 for forming surface layer and the electrophotographic belt 1 were subjected to the following evaluations 1 to 5.

<Evaluation 1: Evaluation on Liquid Stability of Coating Material for Forming Surface Layer>

The coating material for forming surface layer put in a glass bottle having a diameter of 10 mm and a height of 30 mm was allowed to stand. The evaluation was performed based on the following criteria depending on the number of days until a separating layer was visually observed.

A: 5 days or more

B: 1 day to 4 days

C: less than 1 day

<Evaluation 2: Evaluation on Dispersion Uniformity of Domain>

The uniformity of dispersion state of PFPE-OH in the surface layer was evaluated based on the standard deviation of the major diameter of domain of PFPE-OH. For measurement of the major diameter of PFPE-OH, the cross-section of the surface layer of the electrophotographic belt in the thickness direction was observed using a scanning electron microscope (trade name: S-4800, manufactured by Hitachi High-Tech Corporation). First, using a microtome (trade name: EM UC7, manufactured by Leica Microsystems Inc.), from the surface layer of an electrophotographic belt, a sample with a cross-section in the thickness direction exposed was cut out. An SEM image in which a portion having at least one or more domains identified in a unit area of 15 $\mu m^2$ in the cross-section at a magnification power of 20000 was used. In the case where 10 or less domains were present, the major diameters of all the domains in the visual field were measured. In the case where more than 10 domains were present, 10 domains were randomly selected to measure the major diameters. The operation was repeated 10 times at locations with a different cross-section so as to calculate the standard deviation of the major diameter of 100 domains in total, measured in 10 cross-sectional SEM images.

<Evaluation 3: Evaluation on Image-Rank of Image Quality>

The electrophotographic belt was fitted to a full-color electrophotographic image forming apparatus (trade name: iRC 2620, manufactured by Canon Inc.) as replacement for an electrophotographic belt fitted thereto, so as to form electrophotographic images. The images thus formed were blue solid images with magenta and cyan superimposed. Each of an image 1 on a first sheet immediately after start of image formation, an image 2 on a 300000th sheet, and an image 3 on a 600000th sheet was subjected to evaluation on the presence of image defects due to transfer failure of image from the intermediate transfer belt. The evaluation was performed by visual observation of 5 evaluators based on the following criteria. A rank given by highest number of evaluators was presumed as evaluation result.

Rank A: No degradation in image quality due to transfer failure is observed.

Rank B: Degradation in image quality due to transfer failure is scarcely observed.

Rank C: Degradation in image quality due to transfer failure is observed.

<Evaluation 4: Evaluation on Toner Adhesion-Contact Angle>

The evaluation on toner adhesion on the outer surface of an electrophotographic belt was determined by the contact angle of normal hexadecane (n-HD). The n-HD contact angel was measured at 12 points in total including 4 points in the circumferential direction and 3 points in the longitudinal direction of the electrophotographic belt in Examples and Comparative Examples to calculate the average and the standard deviation. In the measurement, a contact angle meter (trade name: PCA-11, manufactured by Kyowa Interface Science Co., Ltd.) was used. The measurement of contact angle was performed immediately before start of image formation in the evaluation 3 (initial), immediately after formation of 300000 images (after 300 k), and immediately after formation of 600000 images (after 600 k).

<Evaluation 5: Evaluation of Image-Unevenness in Density>

The presence of difference in density between the image 1 and the image 2 used in the evaluation 3 for evaluating rank of image quality and difference in density between the image 1 and the image 3 were determined. In the case where the difference in density was observed, the degree of difference was visually observed by 5 evaluators to evaluate based on the following criteria. A rank given by highest number of evaluators was presumed as evaluation result.

Rank A: No difference in density is observed compared with the image on the first sheet.

Rank B: Slight difference in density is identified compared with the image on the first sheet.

Rank C: Definite difference in density is identified compared with the image on the first sheet.

Examples 2 to 3

Coating materials 2 to 3 for forming surface layer were prepared by the same method as in Example 1, except that the dispersant 1 was replaced with a dispersant 2 or 3. Electrophotographic belts 2 to 3 were made in the same manner as in Example 1, except that the coating material 2 or 3 for forming surface layer was used. The coating materials 2 to 3 for forming surface layer, and the electrophotographic belts 2 to 3 were evaluated in the same manner as in Example 1.

Example 4

A coating material 4 for forming surface layer was prepared in the same manner as in Example 1, except that PFPE-OH1 was replaced with PFPE-OH2 (trade name: Fluorolink D4000, manufactured by Solvay Specialty Polymers K.K.). An electrophotographic belt 4 was made in the same manner as in Example 1, except that the coating material 4 for forming surface layer was used. The coating material 4 for forming surface layer, and the electrophotographic belt 4 were evaluated in the same manner as in Example 1.

Examples 5 to 6

Coating materials 5 to 6 for forming surface layer were prepared in the same manner as in Example 1, except that the dispersant 1 was replaced with a dispersant 4 or 5. Electrophotographic belts 5 to 6 were made in the same manner as in Example 1, except that the coating material 5 or 6 for forming surface layer was used. The coating materials 5 to 6 for forming surface layer, and the electrophotographic belts 5 to 6 were evaluated in the same manner as in Example 1.

Example 7

A coating material 7 for forming surface layer was prepared in the same manner as in Example 1, except that the amount of the dispersant 1 added was changed to 25 mass %. An electrophotographic belt 7 was made in the same manner as in Example 1, except that the coating material 7 for forming surface layer was used. The coating material 7 for forming surface layer, and the electrophotographic belt 7 were evaluated in the same manner as in Example 1.

Example 8

A coating material 8 for forming surface layer was prepared in the same manner as in Example 1, except that the amount of the dispersant 1 added was changed to 5.1 mass %. An electrophotographic belt 8 was made in the same manner as in Example 1, except that the coating material 8 for forming surface layer was used. The coating material 8 for forming surface layer, and the electrophotographic belt 8 were evaluated in the same manner as in Example 1.

Comparative Examples 1 to 6

Coating materials 9 to 14 for forming surface layer were prepared by the same method as in Example 1, except that the dispersant 1 was replaced with dispersants 6 to 11. Electrophotographic belts 9 to 14 were made in the same manner as in Example 1, except that each of the coating materials for forming surface layer was used. The coating materials 9 to 14 for forming surface layer, and the electrophotographic belts 9 to 14 were evaluated in the same manner as in Example 1.

The evaluation results of the electrophotographic belt in each of Examples and Comparative Examples are shown in Table 4.

TABLE 3

| | | Coating material for forming surface layer/No. | PFPE-OH | | Dispersant | |
|---|---|---|---|---|---|---|
| | | | Type | Mw | Type | Amount added (mass %) |
| Example | 1 | 1 | PFPE-OH1 | 1500 | Dispersant 1 | 11.0% |
| | 2 | 2 | PFPE-OH1 | 1500 | Dispersant 2 | 11.0% |
| | 3 | 3 | PFPE-OH1 | 1500 | Dispersant 3 | 11.0% |
| | 4 | 4 | PFPE-OH2 | 4000 | Dispersant 1 | 11.0% |
| | 5 | 5 | PFPE-OH1 | 1500 | Dispersant 4 | 11.0% |
| | 6 | 6 | PFPE-OH1 | 1500 | Dispersant 5 | 11.0% |
| | 7 | 7 | PFPE-OH1 | 1500 | Dispersant 1 | 25.0% |
| | 8 | 8 | PFPE-OH1 | 1500 | Dispersant 1 | 5.1% |
| Comparative Example | 1 | 9 | PFPE-OH1 | 1500 | Dispersant 6 | 11.0% |
| | 2 | 10 | PFPE-OH1 | 1500 | Dispersant 7 | 11.0% |
| | 3 | 11 | PFPE-OH1 | 1500 | Dispersant 8 | 11.0% |
| | 4 | 12 | PFPE-OH1 | 1500 | Dispersant 9 | 11.0% |
| | 5 | 13 | PFPE-OH1 | 1500 | Dispersant 10 | 11.0% |
| | 6 | 14 | PFPE-OH1 | 1500 | Dispersant 11 | 11.0% |

TABLE 4

| | | | | Evaluation 4/Adhesion (Contact angle) | | | | | | Evaluation 3/ Image quality | | | Evaluation 5/ Density unevenness | | |
|---|---|---|---|---|---|---|---|---|---|---|---|---|---|---|---|
| | | | | Average | | | Standard deviation | | | evaluation rank | | | evaluation rank | | |
| | | Evaluation 1 | Evaluation 2 | Initial | After 300k | After 600k | Initial | After 300k | After 600k | Image 1 | Image 2 | Image 3 | Image 1 | Image 2 | Image 3 |
| Example | 1 | A | 15.5 | 65.0 | 60.3 | 51.6 | 1.4 | 1.5 | 1.9 | A | A | A | A | A | A |
| | 2 | A | 17.6 | 64.0 | 60.2 | 52.3 | 1.6 | 1.7 | 2.1 | A | A | A | A | A | B |
| | 3 | A | 16.5 | 63.5 | 59.5 | 51.8 | 1.5 | 1.8 | 2.2 | A | A | A | A | A | B |
| | 4 | A | 18.3 | 63.0 | 59.2 | 50.6 | 1.6 | 1.9 | 2.3 | A | A | A | A | A | B |
| | 5 | B | 36.8 | 64.5 | 55 | 49.5 | 2.6 | 3.0 | 4.0 | A | A | B | B | B | B |
| | 6 | B | 33.9 | 67.0 | 54.5 | 48.2 | 2.4 | 3.2 | 4.3 | A | A | B | A | B | B |
| | 7 | A | 16.8 | 65.0 | 60.5 | 51.4 | 1.5 | 1.9 | 2.3 | A | A | A | A | A | B |
| | 8 | B | 37.1 | 64.3 | 56.2 | 46.1 | 2.7 | 3.1 | 4.5 | A | A | B | B | B | B |
| Comparative | 1 | C | 83.6 | 64.0 | 45.6 | 35.9 | 4.6 | 5.5 | 6.3 | A | B | C | B | C | C |
| Example | 2 | C | 78.9 | 66.0 | 47.6 | 37.5 | 4.4 | 5.1 | 6.2 | A | B | C | B | C | C |
| | 3 | C | 90.5 | 65.3 | 41.1 | 36.9 | 4.3 | 5.6 | 6.8 | A | C | C | B | C | C |
| | 4 | C | 89.5 | 65.5 | 47.5 | 32.1 | 4.8 | 5.7 | 6.4 | A | B | C | B | C | C |
| | 5 | C | 75.8 | 66.5 | 46.1 | 38.5 | 4.5 | 5.2 | 6.0 | A | B | C | B | C | C |
| | 6 | C | 102.6 | 63.8 | 40.6 | 36.7 | 4.1 | 5.9 | 6.7 | A | C | C | B | C | C |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-117600, filed Jul. 8, 2020, and Japanese Patent Application No. 2021-098187, filed Jun. 11, 2021, which are hereby incorporated by reference herein in their entirety.

What is claimed is:

1. An electrophotographic member comprising:

a base layer; and a surface layer containing a perfluoropolyether (PFPE), a fluorine-containing copolymer and at least one of an acrylic resin and a methacrylic resin;

the PFPE having a structure represented by formula (1):

$$HO—H_2C—(CF_2O)_p(CF_2CF_2O)_q—CH_2—OH \quad (1)$$

where p and q each independently represent an integer of 1 or more, the fluorine-containing copolymer having (i) a first polymerized unit of at least one of methyl acrylate (MA) and methyl methacrylate (MMA), and (ii) a second polymerized unit of at least one of methyl acrylate having a fluoroalkyl group (F-MA) and methyl methacrylate having a fluoroalkyl group (F-MMA), wherein a molar ratio of the first polymerized unit and the second polymerized unit is 7 to 12, the fluorine-containing copolymer having a weight average molecular weight (Mw) of 80000 to 150000, and a ratio between number average molecular weight (Mn) and Mw (Mw/Mn) being of 3.3 to 6.5, and the content of the fluorine-containing copolymer in the surface layer is 11 to 30 mass % of the total solid content in the surface layer.

2. The electrophotographic member according to claim 1, wherein the weight average molecular weight of the PFPE is 1000 or more and 9000.

3. The electrophotographic member according to claim 1, wherein the surface layer has a matrix-domain structure having a domain containing the PFPE in the thickness direction.

4. The electrophotographic member according to claim 3, wherein the standard deviation of the major diameter of the domain observed in the cross-section of the surface layer in the thickness direction is 1 to 50 nm.

5. The electrophotographic member according to claim 1, wherein the electrophotographic member is an electrophotographic belt having an endless shape.

6. An electrophotographic image forming apparatus comprising:

an intermediate transfer member, which comprises an electrophotographic member having a base layer and a surface layer, the surface layer containing a perfluoropolyether (PFPE), a fluorine-containing copolymer and at least one of an acrylic resin and a methacrylic resin;

the PFPE having a structure represented by formula (1):

$$HO—H_2C—(CF_2O)_p(CF_2CF_2O)_q—CH_2—OH \quad (1)$$

where p and q each independently represent an integer of 1 or more; and the fluorine-containing copolymer having (i) a first polymerized unit of at least one of methyl acrylate (MA) and methyl methacrylate (MMA), and (ii) a second polymerized unit of at least one of methyl acrylate having a fluoroalkyl group (F-MA) and methyl methacrylate having a fluoroalkyl group (F-MMA), wherein a molar ratio of the first polymerized unit to the second polymerized unit is 7 to 12, the fluorine-containing copolymer has a weight average molecular weight (Mw) of 80000 to 150000, and a ratio between number average molecular weight (Mn) and Mw (Mw/Mn) of 3.3 to 6.5, and the content of the fluorine-containing copolymer in the surface layer is 11 to 30 mass % of the total solid content in the surface layer.

* * * * *